(12) United States Patent
Fagan

(10) Patent No.: US 7,289,243 B2
(45) Date of Patent: Oct. 30, 2007

(54) APPARATUS AND METHOD FOR DATA COMPRESSION OPTIMIZED BY PRINT HEAD ARCHITECTURE

(75) Inventor: Mark W. Fagan, Lexington, KY (US)

(73) Assignee: Lexmark International, Inc., Lexington, NY (US)

( * ) Notice: Subject to any disclaimer, the term of this patent is extended or adjusted under 35 U.S.C. 154(b) by 851 days.

(21) Appl. No.: 10/214,053

(22) Filed: Aug. 7, 2002

(65) Prior Publication Data

US 2004/0032598 A1 Feb. 19, 2004

(51) Int. Cl.
*H04N 1/034* (2006.01)

(52) U.S. Cl. .............. 358/1.8; 358/502; 358/1.18; 358/468; 347/12; 347/19; 347/15; 347/2; 395/114; 395/115; 395/109

(58) Field of Classification Search .......... 358/1.8, 358/502, 1.9, 1.15, 433, 1.18, 468; 347/1, 347/111, 171, 224, 110, 15, 14, 12, 19, 2; 341/55; 395/114, 115, 109
See application file for complete search history.

(56) References Cited

U.S. PATENT DOCUMENTS

| | | | |
|---|---|---|---|
| 4,400,791 A | 8/1983 | Kitado | |
| 4,725,815 A * | 2/1988 | Mitchell et al. | 341/67 |
| 5,199,803 A | 4/1993 | Shimizu et al. | |
| 5,327,254 A | 7/1994 | Daher | |
| 5,475,800 A * | 12/1995 | Vaughn et al. | 358/1.9 |
| 5,596,423 A * | 1/1997 | Pritchard | 358/426.01 |
| 5,692,108 A | 11/1997 | Donahue | |
| 5,787,192 A | 7/1998 | Takaichi et al. | |
| 5,805,174 A | 9/1998 | Ramchandran | |
| 5,854,886 A | 12/1998 | MacMillan et al. | |
| 5,923,820 A | 7/1999 | Cunnagin et al. | |
| 5,930,466 A * | 7/1999 | Rademacher | 358/1.15 |
| 6,038,033 A | 3/2000 | Bender et al. | |
| 6,046,819 A | 4/2000 | Yoshida | |
| 6,069,710 A | 5/2000 | Lee | |
| 6,086,272 A | 7/2000 | Kawase et al. | |
| 6,088,513 A | 7/2000 | Nakagawa et al. | |
| 6,108,101 A | 8/2000 | Cheng et al. | |
| 6,124,943 A | 9/2000 | Mitani | |
| 6,141,122 A | 10/2000 | Ishimaru | |
| 6,154,233 A | 11/2000 | Breswick | |
| 6,390,577 B1 * | 5/2002 | Fajour | 347/2 |
| 6,437,883 B1 * | 8/2002 | Nishii | 358/468 |
| 6,525,678 B1 * | 2/2003 | Veenstra et al. | 341/55 |
| 6,557,964 B2 * | 5/2003 | Kawatoko et al. | 347/15 |
| 6,604,804 B2 * | 8/2003 | Asawaka | 347/14 |
| 6,752,483 B1 * | 6/2004 | Vega et al. | 347/19 |
| 2002/0186265 A1 * | 12/2002 | Schloeman et al. | 347/12 |
| 2002/0196467 A1 * | 12/2002 | Delhoune et al. | 358/1.18 |

* cited by examiner

*Primary Examiner*—King Y. Poon
*Assistant Examiner*—Ashish K. Thomas
(74) *Attorney, Agent, or Firm*—Taylor & Aust, P.C.

(57) ABSTRACT

An apparatus and method to compress data for a print head divides print head nozzle firetime instructions into a plurality of bytes. A control word represents each byte by one bit. Bytes containing data are set from a host computer to a printer. Empty bytes are represented by a "0" in the corresponding bit in the control word. Empty bytes are omitted from transmission. At decompression, omitted bytes are treated as blank space. Bytes are organizing according to print head architecture, nozzle array and printing sequence, for example, in even and odd groups.

4 Claims, 3 Drawing Sheets

Printhead Nozzle Array

Example of 50% Shingle Pattern

Nozzle

1 ● ○ ● ○ ● ○ ● ○ ● ○ ● ○ ● ○ ● ○
2 ○ ● ○ ● ○ ● ○ ● ○ ● ○ ● ○ ● ○ ●
3 ● ○ ● ○ ● ○ ● ○ ● ○ ● ○ ● ○ ● ○
.
.
158 ○ ● ○ ● ○ ● ○ ● ○ ● ○ ● ○ ● ○ ●
159 ● ○ ● ○ ● ○ ● ○ ● ○ ● ○ ● ○ ● ○
160 ○ ● ○ ● ○ ● ○ ● ○ ● ○ ● ○ ● ○ ●

50% Checkerboard Shingling Pattern 1st Pass

Nozzle

1 ○ ● ○ ● ○ ● ○ ● ○ ● ○ ● ○ ● ○ ●
2 ● ○ ● ○ ● ○ ● ○ ● ○ ● ○ ● ○ ● ○
3 ○ ● ○ ● ○ ● ○ ● ○ ● ○ ● ○ ● ○ ●
.
158 ● ○ ● ○ ● ○ ● ○ ● ○ ● ○ ● ○ ● ○
159 ○ ● ○ ● ○ ● ○ ● ○ ● ○ ● ○ ● ○ ●
160 ● ○ ● ○ ● ○ ● ○ ● ○ ● ○ ● ○ ● ○

50% Checkerboard Shingling Pattern 2nd Pass

FIGURE 2

Flowchart for Compression / Decompression of Print Data

APPARATUS AND METHOD FOR DATA COMPRESSION OPTIMIZED BY PRINT HEAD ARCHITECTURE

CROSS-REFERENCE TO RELATED APPLICATIONS

None.

STATEMENT REGARDING FEDERALLY SPONSORED RESEARCH OR DEVELOPMENT

Not Applicable.

TECHNICAL FIELD

This invention relates to printers, and particularly to ink jet printers that print in swaths across an underlying document.

BACKGROUND OF THE INVENTION

Ink jet printers using an array of multiple nozzles have been available for years. In such printers, these nozzles are typically grouped together on a print head, which typically is affixed to a moveable carriage or carrier that moves left and right in a horizontal manner with respect to a sheet of paper that is moving or indexing in a perpendicular, vertical direction. The multiple nozzles are typically grouped in a vertical column on the print head (or multiple vertical columns, especially in a color printer).

On one horizontal pass of the print head multiple horizontal "columns" of dots are simultaneously laid down in a "swath" of ink upon the paper or other print media. As the print head travels in the horizontal direction, it produces tiny dots along the swath according to a "print plan" that has been received by the printer, typically from a host computer. The "width" (i.e., "height," in this orientation) of the swath is dependent upon the resolution of the print head nozzles (such as 300 dpi (dots per inch)), which is 1/300 inch resolution, as well as the number of nozzles in the vertical column array on the print head. If, for example, the print head has an array of 104 nozzles, and its resolution is 300 dpi, then the swath would be approximately 1/3 inch in width. Typical conventional printers format the print data so that each of the nozzles receives a digital (i.e., either "on" or "off") datum bit of information virtually simultaneously, which means that, in the above example, a data set of at least 104 bits must be sent to the printhead to control the 104 nozzles that are ready to either print a dot by turning ON (e.g., Logic 1), or to not print a dot which would be the nozzle's OFF state (e.g., Logic 0). This data set for a particular instant of time to control the entire vertical column array of 104 nozzles is designated by the term "firegroup." Therefore, to create a swath of print data, firegroup after firegroup of print data must be sent to the print head to sequentially turn ON or OFF each of the print head's nozzles at the correct times to reproduce the print data pattern representation. In the above example of the prior art, each firegroup must contain 104 bits of print data and, assuming that the horizontal resolution was also 300 dpi, there would then have to be 300 slices of data per horizontal inch of print head travel via its carrier.

In conventional ink jet printers, it is typical to import the print data from a host PC and to store that print data in the form of a "bitmap." Bitmap information typically arrives as a series of words of sixteen (16) bits each until a complete slice has been defined. Once the first slice of a swath has been received and stored in the printer's memory system, additional words are then received to define the next consecutive slice, and this procedure continues until all of the slices for a swath have been received and then stored in the printer's memory system. After the first swath has been completed, the subsequently received print data will again be in groupings of words to define the first slice of the next swath, which typically is the adjacent swath to the one that has just been completed.

This process continues until all of the slices for all of the swaths have been received for an entire page to be printed. If no data compression or data compacting techniques are used, the bitmap received by the printer and subsequently stored in the printer's memory system will represent a series of vertical slices adjacent to one another to make up a swath, and a series of horizontal swaths that are adjacent to one another to define the entire vertical structure of the page to be printed. All of these slices and swaths form an entire rectangular page of bitmap print data.

This approach is very memory intensive, because all of the "blank" areas where nothing is to be printed nevertheless require the same amount of memory space as areas that have data to be printed. Without any type of data compression or data compacting techniques, the amount of memory area required to store a single page of print data will always be the number of bits required to make up all of the slices of each swath times the number of swaths for that page. For example, if an entire 8½ by 11 inch page of print data were to be stored in memory at 300 dpi, there would be (8.5 times 300) times (11 times 300)=8,415,000 bits required. This roughly eight million bits of data corresponds to just over one million bytes of memory space required in the printer's memory system, and that is assuming no extra bits are used for any error checking routines, which are typical. It is easy to see that there are advantages to reducing the amount of memory space required to hold print data in such printing systems.

In addition to the memory required to store the printer data in the form of a bitmap, resources are required to create a print plan and to operate the print engine which reads the print plan and operates the print head. The creation of the print plan translates a swath of the bitmap into a series of consecutive firegroups, as is known in the art. A print engine is responsive to each firegroup and causes the necessary nozzles to be fired at a required position of the page. "Shingling" and multiple pass printing are incorporated into the print plan at this stage. There are two limitations to the current practice. First, the amount of data necessary to convey a bitmap to the printer can exceed the capacity of the connections as well as requiring a large amount of memory in the printer for storage. In addition, the creation and execution of the print plan requires additional storage resources in the printer and can delay the printing process as the necessary calculations are made.

To reduce the amount of data sent by the host PC much of the prior art focuses on compressing the bitmap data. Run Length Encoding (RLE) is typical of the types of data management used. Most compression schemes are effective when portions of the bitmap are empty or contain repeating data. These schemes are especially useful for printing word processing documents. The development of color printers has increased the demand for printing images (such as photographs). These types of printing jobs are not conducive to the current data compression schemes because of the lack of empty or repeating data.

The bitmap created by the host PC can be sent to multiple devices for printing. For example, the bitmap can be sent to an attached printer, a stand-alone printer and to a fax machine. All of the machines can subsequently print an image after transforming the bitmap into a print plan specific to that device. Although this system is useful for multiple uses of the bitmap, the tremendous processing power and data storage capabilities of the host PC are not effectively utilized. Accordingly data management systems which create the print plan on the host PC have been developed. The data is then sent to the printer. The data is then utilized by the print engine to control the print head and create the desire image. There is a need for a method and apparatus of compressing the data generated by the host PC before transmission to the printer.

SUMMARY OF THE INVENTION

In one embodiment, the invention is a method and apparatus for compressing and decompressing data sent to a printing device such as a printer that utilizes a printhead. For example, a PC creates a print plan specific to the printer. The print plan is composed by reducing a page to a series of print swaths. The print swaths are composed of a series of firegroups corresponding to nozzle activation at specified points on the page. An initial firegroup is created corresponding to the beginning of a print swath. The firegroups are created consecutively until the swath is completed. The swaths are created consecutively until the page is completed.

According to one embodiment, the invention analyzes each firegroup and compresses the data prior to transmission to the printer. The data can be decompressed and the firegroup sent to the print head. The compression can occur by mapping the nozzles into an even/odd nozzle map. The nozzles in each map can be further sorted into groups of eight. Each group of eight nozzles can be identified by a byte. The firegroup can be loaded into the nozzle map such that activated nozzles for that firegroup are represented by a "1", and idled nozzles are represented by a "0".

A control can be created to identify the groups and to indicate the groups having information to transmit to the printer. The control can also indicate which groups of data have been eliminated to compress the data to allow the firegroup to be reconstructed at the printer. The compressed firegroup can be sent to the printer. In one embodiment, any byte having all idled nozzles is not sent. The firegroup can be recreated at the printer by replacing the missing bytes with all idled nozzle commands.

Further features and advantages of the present invention, as well as the structure and operation of various embodiments of the present invention, are described in detail in the exemplary embodiments presented below with reference to the accompanying drawings.

BRIEF DESCRIPTION OF THE DRAWINGS

The accompanying drawings, which are incorporated in and form a part of the specification, illustrate exemplary embodiments of the present invention and together with the description, serve to explain the principles of the invention. In the drawings:

FIG. 2 illustrates a shingling print sequence pattern.

DETAILED DESCRIPTION OF EXEMPLARY EMBODIMENTS

Figure 1:
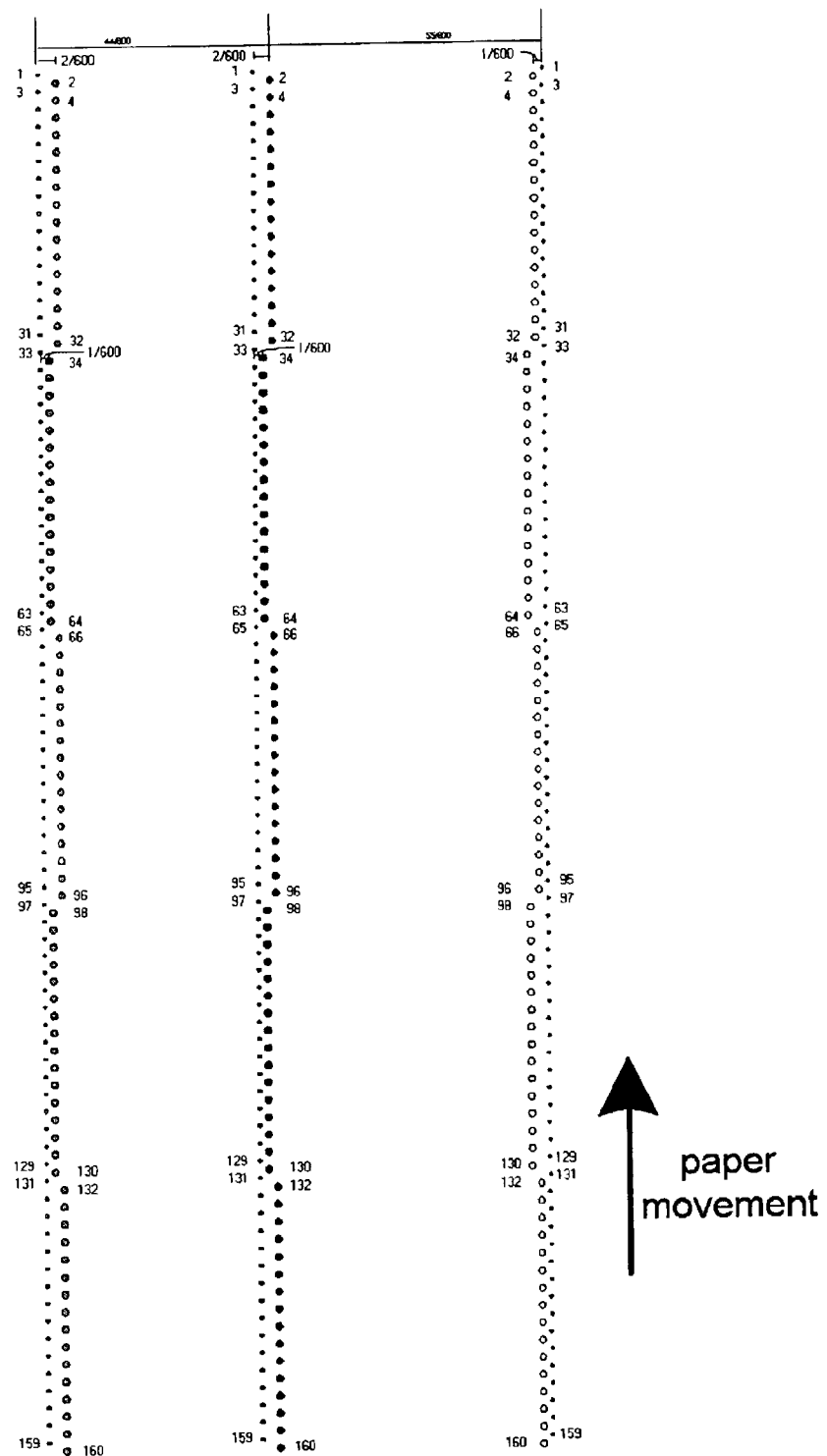
FIG. 1 illustrates a print head nozzle array.
Figure 3:
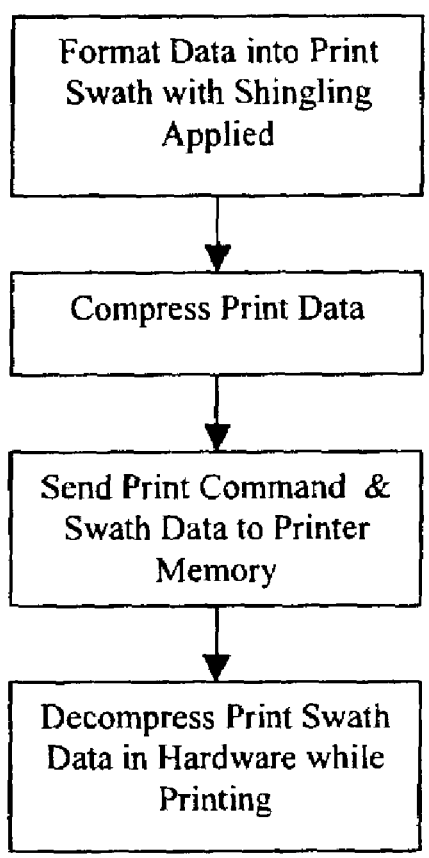
FIG. 3 is an operational flow chart.

The description of this invention is given by way of examples. Although the examples are specific, the algorithm may be applied to different print head configurations. The system and method may be implemented in hardware or software.

In one embodiment, the present invention is drawn to a method and apparatus for compressing the amount of data sent to a printer from a host PC. The print plan can be compressed in the host PC and then decompressed using hardware in the printer.

The creation of a bitmap and a print plan for printing the bitmap are known in the art. Commonly owned U.S. Pat. Nos. 5,923,820; 5,930,466; and 6,038,033 (hereby incorporated by reference) demonstrate different data compression schemes useful for reducing the amount of data associated with the bitmap to be sent to the printer. In an exemplary embodiment of the current invention, a print plan is created based on a bitmap accessed through an application at the host computer and then organized by a method of the invention according to the print head architecture. Print heads for ink jet printers, for example, have multiple nozzles which may be used in a variety of print sequences.

The individual components of the print plan are called firegroups. A firegroup dictates which nozzles of the print head will be activated at a particular time. Each particular time corresponds to a particular position of the print head over the page being printed. (Hence "firegroups" are sometimes also accurately be referred to as "firetimes.") A print swath is composed of firegroups from a start point on one side of the page to an end point of the print swath on the other side of the page. A page is composed of print swaths progressing from top to bottom.

A printer typically receives the print plan in memory one firegroup at a time. The print engine controls the print head and starts printing at a start point corresponding to the beginning of a print swath. The print engine accesses the print plan when the print head arrives at the start point. The print engine then causes activation of those nozzles indicated by the firegroup for that point. The print head is then moved forward to the next point and the next firegroup is accessed.

The next point to be printed is determined by the resolution of the printed image. If the image is being printed at 600 dot per inch (dpi) resolution, then the print head moves $\frac{1}{600}^{th}$ of an inch for each firegroup. After the nozzles indicated by the firegroup are activated the process is repeated for all of the firegroups corresponding to the print swath until the end point is reached. This could be for a single pass or a multiple pass print swath.

The next print swath is started by moving the paper forward and returning the print head to the start position for that print swath. The above process is repeated for each print swath until a page is completed. In an exemplary embodiment of the present invention, after the print plan has been generated, the data is compressed using the nozzle map described below.

For example, in one embodiment, an Even/Odd nozzle map is created based upon the print head architecture. In the embodiment depicted in FIG. 1 the print head has 160 nozzles, but could be any number of nozzles. The nozzles are assigned numbers and then divided into even and odd groups by number. The even nozzles are then further divided into groups of nozzles. In one exemplary embodiment the even nozzles are then divided into ten groups of eight nozzles each. The odd nozzles are then further divided into 10 groups of eight nozzles (in the exemplary embodiment). According to one method of the present invention, nozzle grouping may be organized and grouped in any fashion that optimizes speed and efficient use of particular print head nozzle arrays and particular print sequences and print plans.

A byte can be assigned to each group of nozzles. In an exemplary embodiment, even Byte 1 would have the print data for nozzles numbered 2, 4, 6, 8, 10, 12, 14 and 16. Odd Byte 1 would have the print data for nozzles numbered 1, 3, 5, 7, 9, 11, 13, 15 and 17. The remaining nozzles would be similarly associated with a byte of eight bits; one bit per nozzle.

In one embodiment there are 160 nozzles. In accordance with this architecture, a multiple of eight in even and odd numbered rows, the compression algorithm has ten even nozzle Bytes and ten odd nozzle Bytes. The compression algorithm can be used with any number of nozzles by providing enough bytes to accommodate all the nozzles, and/or by changing the number of bits in each byte. Those elements of the byte not having an associated nozzle would be set to zero.

The compressed firegroup is completed with a control word to identify each of the ten odd nozzle groups and each of the ten even nozzle groups in one embodiment. The control word has three bytes and is used to indicate which of the groups of nozzles has information to be transferred to the printer. One bit in the control word represents each one of the 20 following data bytes.

The printer can decompress the print data by first referring to the control word and then referring to the print data. The printer defaults all nozzle positions to idle and uses the print data to overwrite those nozzle locations to be fired as indicated by the compressed print data to recreate the firegroup. This information can be used by the print engine to actuate the nozzles in the print head as dictated by the firegroup.

An effective method of demonstrating the compression scheme is to show the compression and decompression of an actual firegroup. Using the nozzle architecture of the previous exemplary embodiment, suppose a demonstration firegroup has nozzles 1, 2, 159, and 160 being fired and all other nozzles being idled. This information is sent to the printer as a series of one and zeros. The total data requires 20 bytes (160 nozzles divided by 8 nozzles/byte).

The demonstration firegroup is mapped according to the compression scheme:

| Even Nozzle Map | Odd Nozzle Map |
|---|---|
| Even Byte 1 = [1,0,0,0,0,0,0,0] | Odd Byte 1 = [1,0,0,0,0,0,0,0] |
| Even Byte 2 = [0,0,0,0,0,0,0,0] | Odd Byte 2 = [0,0,0,0,0,0,0,0] |
| Even Byte 3 = [0,0,0,0,0,0,0,0] | Odd Byte 3 = [0,0,0,0,0,0,0,0] |
| Even Byte 4 = [0,0,0,0,0,0,0,0] | Odd Byte 4 = [0,0,0,0,0,0,0,0] |
| Even Byte 5 = [0,0,0,0,0,0,0,0] | Odd Byte 5 = [0,0,0,0,0,0,0,0] |
| Even Byte 6 = [0,0,0,0,0,0,0,0] | Odd Byte 6 = [0,0,0,0,0,0,0,0] |
| Even Byte 7 = [0,0,0,0,0,0,0,0] | Odd Byte 7 = [0,0,0,0,0,0,0,0] |
| Even Byte 8 = [0,0,0,0,0,0,0,0] | Odd Byte 8 = [0,0,0,0,0,0,0,0] |
| Even Byte 9 = [0,0,0,0,0,0,0,0] | Odd Byte 9 = [0,0,0,0,0,0,0,0] |
| Even Byte 10 = [0,0,0,0,0,0,0,1] | Odd Byte 10 = [0,0,0,0,0,0,0,1] |

The Bytes are then analyzed to generate the 24 bit control. In the control the first 4 bits identify the control mode. The next 20 bits identify the information being sent for each Even and Odd Byte. Each Even and Odd Byte is analyzed by a compression module to test for zero.

The twenty-four bit control is then generated for the demonstration firegroup. The first four bits identify the control. The next ten bits correspond to the Even Nozzle data and the final ten bits correspond to the Odd Nozzle data. The first bit corresponding to the Even Nozzles corresponds to Even Byte 1. If the value of a Byte is not equal to zero then the bit value for that Byte is set to 1. If the value of a Byte is equal to zero (0) then the control bit corresponding to that Byte is set equal to zero (0). In the demonstration firegroup the control word thus is set to **10000000011000000001. (The bits ** designate the control mode.)

The compression can be completed by coupling the data corresponding to those Bytes not set to "0" in the control word to the compressed firegroup print plan. Those Bytes set to "0" in the control word are omitted from the compressed firegroup print plan and not transmitted to the printer. Therefore, after the values for Even Byte 1, Even Byte 10, Odd Byte 1 and Odd Byte 10 are entered after the control word, the decompression is completed and the firegroup can be sent to the print engine to activate the print head.

For the demonstration firegroup the compressed firegroup print plan data will look like:

****100000000110000000011000000000000001100000
0000000001.

The uncompressed firegroup print plan data of the prior art is far longer:

11000000000000000000000000000000000000000000
00000000000000000000000000000000000000000000
000000000000000000000000000000000000
00000000000000000000000000000011.

As can be seen the twenty byte firegroup has been compressed to seven bytes for transfer (56 bits of information as compared to 160).

As this compressed firegroup is received by the printer the decompression can take place. The first twenty-four bits are read and then the rest of the print data is placed accordingly in the printer nozzle map as dictated by the twenty-four bit control word. In the above case the control indicates that Even Byte 1, Even Byte 10, Odd Byte 1 and Odd Byte 10 have information following the control word information. The control word bits for the remaining Even and Odd Bytes are set with all values equal to "0." This instructs that the remaining Even and Odd Bytes are all null sets, corresponding to blank space on the page in which no nozzles are to be fired. Accordingly the print engine opens the data bytes coupled with the control word bits set to "1" and from those bytes reads the nozzles to be fired. For those null bytes omitted in transmission and represented in the compressed form of a "0" bit in the control word, the printer engine reads that no nozzles are to be fired in the print plan groups for those bytes, and executes the print sequence accordingly.

The compression method can be used with a print head having any number of nozzles. The compression will work for a print head having any number of nozzles by grouping in a manner that is optimal for the printhead nozzle array as described above, and by grouping in a manner that is optimal for the print sequence plan, as described below. Any number of nozzles may be accommodated by dividing them into bytes of appropriate size.

The compression method can also be applied and used with multiples of the nozzles. For example, the 160 nozzles in the embodiment described herein correspond to a color head. A mono head might have 640 nozzles, for example. By using four sets of firegroups the compression scheme is the same and the firegroup for all 640 nozzles can be decompressed from the four sets of compressed data.

The method and apparatus for data compression is especially useful when the print sequence plan includes provisions for "shingling". During shingling a checkerboard pattern is laid down by the print head on a first pass in the print swath, as shown in FIG. 2. The unprinted portion is then filled in on a return pass of the print head. This is accomplished by setting the odd or even nozzles to idle depending on the print head direction. As a result at least half of the data in a firegroup can be compressed.

Even in non-shingled modes of printing the method and apparatus of data compression is effective for null data compression. For color printing, multiple pass print swaths might be required and necessarily only a portion of the nozzles are needed for each pass of the printhead. Embodiments of the current invention are effective in this environment by compressing the print data for idled nozzles.

The method and apparatus for data compression is effective because, for example, the data corresponding to a non event (idle print nozzle) is eliminated. Other data compression schemes require print data to be included even for idled nozzles.

In one embodiment, the present invention uses technology known in the art to create a print plan for creating a desired print image in the host. By creating the print plan in the host PC the amount of resources dedicated to the printer can be reduced. By sending the data to be used by the print engine to the printer, rather than a bitmap that the printer driver must extract necessary data from to print, printer performance can be improved.

In an exemplary embodiment, the print plan is composed of a series of firegroups. The individual firegroups are compressed using the Even/Odd nozzle data compression scheme and sent to the printer. The firegroups are decompressed using the same scheme and then sent to the print engine. The specific plan above was developed for a 160 nozzle print head. The technology can be extended generally according to the invention.

The array of nozzles can be analyzed and divided into at least two groups. The groups are selected strategically. In the specific example given, grouping the nozzles into even and odd groups was dictated by the practice of "shingling". There exists a print head having groups of different size nozzles. Depending upon the desired resolution, only a specific sized nozzle is utilized. Grouping these nozzles by size would ensure compression of the nozzle data associated with the nozzles not being utilized.

These nozzle groups can be further divided into subgroups. In one embodiment, the number of subgroups is dependent upon the number of nozzles represented by each subgroup. The number of nozzles represented by each subgroup can be any number. The method and apparatus for data compression can be based upon the association of each subgroup of nozzles with a single element of the control bit. The compression can be created by eliminating the print data for a subgroup having all idled nozzles. The elements of a subgroup can be tested for potential elimination from the data set by calculating the sum of the elements. If the sum of the elements is zero then that subgroup can be eliminated from the data set. If the sum of the elements is not equal to zero then that subgroup can be sent with the data set.

In view of the foregoing, it will be seen that the several advantages of the invention are achieved and attained.

The exemplary embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, the test for the subgroup could be an if/then loop to test for the absence of activated nozzle data. Thus, the breadth and scope of the present invention should not be limited by any of the above-described exemplary embodiments, but should be defined only in accordance with the following claims appended hereto and their equivalents.

What is claimed is:

1. A method of data compression for use with a system having a computer operatively connected to a printing device, the printing device having a print head with a plurality of nozzles and being responsive to a print plan created by the computer, the print plan dividing a desired print page into print swaths, a print swath defined as an area covered by a print head traveling across the print page, the print swath being divided into a plurality of firegroups, a firegroup defined as activated nozzles and idled nozzles in the print head at a print location, the print plan having consecutive firegroups from a start point to an end point of a print swath and consecutive print swaths from a top to a bottom of the print page, the data compression method comprising the steps of:

Numbering the plurality of nozzles;

grouping the plurality of nozzles into consecutive groups of eight even numbered nozzles and consecutive groups of eight odd numbered nozzles;

associating each consecutive group of eight even nozzles with an even nozzle byte;

associating each consecutive group of eight odd nozzles with an odd nozzle byte;

associating each even nozzle byte with an even bit in a control;

associating each odd nozzle byte with an odd bit in the control;

mapping a firegroup into said even nozzle bytes and said odd nozzle bytes;

setting the even bit in the control to zero when the associated even nozzle byte has all idled nozzles mapped and setting the even bit in the control to one when an activated nozzle is mapped;

setting the odd bit in the control to zero when the associated odd nozzle byte has all idled nozzles mapped and setting the odd bit in the control to one when an activated nozzle is mapped;

coupling the control with the even nozzle bytes associated with an even bit in the control set to one;

coupling the control with the odd nozzles bytes associated with an odd bit in the control set to one.

2. A method of data compression for use with a system having a computer operatively connected to a printing device, the printing device having a print head with a plurality of nozzles and being responsive to a print plan created by the computer, the print plan dividing a desired print page into print swaths, a print swath defined as an area covered by a print head traveling across the print page, the print swath being divided into a plurality of firegroups, a firegroup having a series of commands corresponding to the print head wherein each command is a number for a corresponding nozzle of the print head such that an activated nozzle is represented by a one and an idled nozzle is represented by a zero for a print location, the print plan having consecutive firegroups from a start point to an end point of a print swath and consecutive print swaths from a top to a bottom of the print page, the data compression method comprising the steps of:

accessing a firegroup;

numbering the series of commands from the firegroup;

grouping the series of commands into a plurality of even command groups and a plurality of odd command groups, wherein each even and odd command group has eight commands;

creating a control having a plurality of even bits and a plurality of odd bits;

associating each of the plurality of even bits with one of the plurality of even command groups;

associating each of the plurality of odd bits with one of the plurality of odd command groups;

setting the even bit equal to zero when all of the commands of the associated even command group are zero and setting the even bit equal to one when any of the commands is equal to one;

setting the odd bit equal to zero when all of the commands of the associated odd command group are zero and setting the odd bit equal to one when any of the commands is equal to one;

compiling a compressed firegroup having the control and the even command groups associated with an even bit equal to one and the odd command groups associated with an odd bit equal to one.

3. A method of data compression for a data set having print commands for a plurality of nozzles, the print command for an idle nozzle being represented by a zero and the print command for an activated nozzle being equal to a one, the method comprising the steps of:

Grouping the data set into at least one Group;

sub-grouping the Group into a plurality of sub-groups wherein each sub-group has a plurality of print commands;

creating a control data set having an identification portion and a print data portion, wherein each of the plurality of sub-groups is associated with a nozzle bit in the print data portion;

analyzing the plurality of sub-groups by evaluating the values of the print commands;

setting the nozzle bit of the print data portion of the control data set equal to zero when the value evaluated in the analyzing step is equal to zero and setting the nozzle bit of the print data portion of the control data set equal to one when the value evaluated in the analyzing step is not equal to zero;

creating a compressed data set equal to the control data set in combination with the sub-groups having values not equal to zero as determined by the analyzing step.

4. The method of claim 3 further comprising:

Decompressing the compressed data set by reading the control data set;

extracting the sub-groups from the compressed data set;

replacing the sub-groups having a corresponding nozzle bit equal to zero with null sub-groups; and using the control data set to assemble the sub-groups from the extracting and replacing steps into the data set having print commands for a plurality of nozzles.

\* \* \* \* \*